(12) United States Patent
Gailloux et al.

(10) Patent No.: US 8,117,123 B1
(45) Date of Patent: Feb. 14, 2012

(54) LOCAL STORAGE AND PRESENTATION OF SELF-HELP INFORMATION

(75) Inventors: Michael A. Gailloux, Overland Park, KS (US); Kenneth Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 307 days.

(21) Appl. No.: 12/349,510

(22) Filed: Jan. 6, 2009

(51) Int. Cl.
*G06Q 40/00* (2006.01)
*H04M 15/00* (2006.01)

(52) U.S. Cl. ......... 705/39; 705/30; 705/40; 379/114.16; 379/114.2

(58) Field of Classification Search ............... None
See application file for complete search history.

(56) References Cited

U.S. PATENT DOCUMENTS

| | | | |
|---|---|---|---|
| 6,442,532 B1* | 8/2002 | Kawan | 705/36 R |
| 7,024,174 B2* | 4/2006 | Nagy et al. | 455/408 |
| 7,215,942 B1* | 5/2007 | McQuaide et al. | 455/408 |
| 2002/0049675 A1* | 4/2002 | Kailamaki et al. | 705/44 |
| 2006/0037835 A1* | 2/2006 | Doran et al. | 194/302 |
| 2006/0287004 A1* | 12/2006 | Fuqua | 455/558 |
| 2008/0010215 A1* | 1/2008 | Rackley, III et al. | 705/70 |
| 2008/0126145 A1* | 5/2008 | Rackley, III et al. | 705/7 |
| 2009/0099965 A1* | 4/2009 | Grant, IV | 705/41 |

\* cited by examiner

*Primary Examiner* — Faris Almatrahi

(57) ABSTRACT

A mobile device is disclosed. The mobile device comprises a display, a memory, and an application. The memory contains wireless communication service account information comprising at least one of an identification of a service plan, a terms of the service plan, a date of the service plan, a current count of consumed service minutes, a current count of consumed text messages, a current count of unused service minutes, a current count of unused text messages, and a record of a plurality of most recent communication sessions. The application, when executed on the mobile device, receives updates of the wireless communication service account information and writes the updated wireless communication service account information to the memory. The application, when selected by an input, also presents at least some of the wireless communication service account information on the display.

19 Claims, 6 Drawing Sheets

LOCAL STORAGE AND PRESENTATION OF SELF-HELP INFORMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When a mobile phone is purchased, the customer may set up an account on which they are billed periodically for service and usage, or they may set up a prepaid mobile phone account on which they can purchase credit to use on a mobile phone network. For a pre-paid mobile phone, the user pays for cell phone use ahead of time and can then use the mobile phone network until the credit runs out. The pre-paid credit may be in the form of a number of minutes and/or a number of text messages. In some cases, credit on a pre-paid mobile phone may have a time limit, for example, 90 days from the time credit was purchased. When the credit runs out, the mobile phone user can add more credit to the account by various means (e.g., by entering a credit/debit card transaction on the phone, by accessing a third party software, by purchasing a top-up card at a retail store).

SUMMARY

In an embodiment, a mobile device is provided. The mobile device comprises a display, a memory, and an application. The memory contains wireless communication service account information comprising at least one of an identification of a service plan, a terms of the service plan, a date of the service plan, a current count of consumed service minutes, a current count of consumed text messages, a current count of unused service minutes, a current count of unused text messages, and a record of a plurality of most recent communication sessions. The application, when executed on the mobile device, receives updates of the wireless communication service account information and writes the updated wireless communication service account information to the memory. The application, when selected by an input, also presents at least some of the wireless communication service account information on the display.

In another embodiment, a method of providing customer service for a mobile communication device is provided. The method comprises receiving a wireless communication service account information, wherein the information comprises at least one of an identification of a service plan, a terms of the service plan, a date of the service plan, a current count of consumed service minutes, a current count of consumed text messages, a current count of unused service minutes, a current count of unused text messages, and a record of a plurality of most recent communication sessions. The method also comprises storing the wireless communication service account information in a memory of the mobile communication device and in response to receiving a control input selection, presenting at least some of the wireless communication service account information on a display of the mobile communication device.

In another embodiment, a method of completing a payment for wireless communication service for a mobile communication device is provided. The method comprises receiving wireless communication service account information, wherein the information comprises at least one of a terms of a wireless communication service plan, a date of the service plan, and a notification that the wireless communication service is terminated. The method also comprises storing the wireless communication service account information in a memory of the mobile communication device and presenting at least some of the wireless communication service account information on a display of the mobile communication device. The method also comprises presenting an input control for initiating a payment for the wireless communication service in response to receiving notification that the wireless communication service is terminated.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
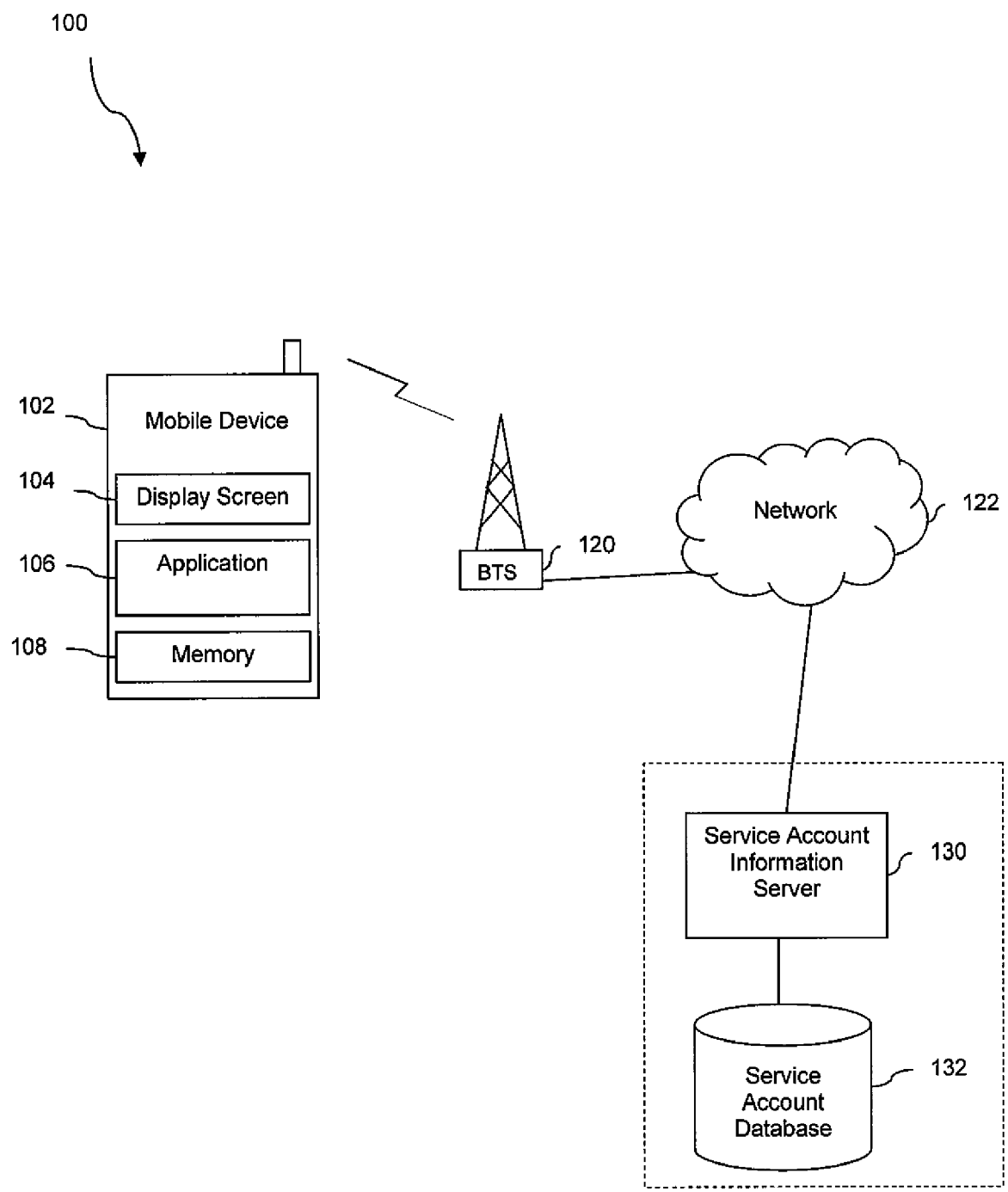
FIG. 1 illustrates a wireless communication service account information system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method for local storage and presentation of self help information on a mobile device is disclosed. By prepaying for communication service for the mobile device, a user can purchase credit in advance of usage. When the number of minutes/text messages runs out or the contract period expires, the user can add more credit to the account. Currently, once the service is terminated or expired, the mobile device has no service so that the user cannot add credit on the handset itself, but may need to call a communication service provider to reactivate the mobile device. The additional resources required to handle phone calls for pre-paid communications every time the user wants to add credit to an account or obtain service account information, can create an added expense for the communication service provider.

In an embodiment, an application on the mobile device may allow the user to obtain service account information and add credit to a pre-paid account, without calling the communication service provider. For example, the application may provide an interface for adding funds to the pre-paid account and may communicate information about the added funds to the communication service provider. A memory on the mobile device may contain the service account information such as the expiration date, the terms of the service plan, the number of minutes purchased, the number of texts purchased, the number of minutes remaining, the number of texts remaining, recent activity, or recent funds added. In an embodiment, this information may be updated to the memory periodically, possibly at times of low usage (e.g., during the night). In another embodiment, this information may be updated to the memory after each time the mobile device is used for communication. A display screen on the mobile device may include an icon or a scroll down menu that allows easy access to view the current service account information, recent activity, or a termination notification. Alternatively, the user could access a voice message that presents the service account or termination information. In addition, by keeping the wireless application protocol (WAP) communication open, even if the service has expired and/or no credit remains on the account, the user can still access the service account information, view recent activity, and add funds to the account via a credit/debit card without calling the communication service provider. In an embodiment, the wireless application protocol service may be disabled a predefined length of time after the termination notification is received by and/or transmitted to the mobile device, for example a day after, a week after, a month after, or some other predefined duration that is effective to give the subscriber sufficient opportunity to add funds to the account. After the termination notification is sent, however, in an embodiment the voice and text communication services of the wireless plan may be terminated, and the user would not be able to make or receive any phone calls or to send or receive any text messages.

Turning now to FIG. 1, a system 100 for local storage and presentation of self-help information on a mobile device is described. The system 100 comprises a mobile device 102 that contains a display screen 104, an application 106, and a memory 108. The system 100 also comprises a base transceiver station 120, a network 122, a service account information server 130, and a service account database 132. The mobile device 102 can communicate wirelessly through the base transceiver station 120 and the network 122 to the service account information server 130 and may be implemented as a mobile phone, a personal digital assistant, or other mobile electronic device having wireless communication capability. A mobile phone is discussed in detail hereinafter. In an embodiment, the memory 108 may be a nonvolatile memory that retains the wireless communications service account information when the mobile device is powered off. In another embodiment, the memory 108 may be a volatile memory such as a dynamic random access memory. The display screen 104 may be a multi-line graphical display or a single line text only display. The application 106 may present the account information as a visible message and/or an audible message. The service account information server 130 stores the service account information for each mobile device in the service account database 132.

In an embodiment, the service account information for an account that is stored in the service account database 132 may include a beginning date, an expiration date, the number of minutes or text messages purchased, the number of minutes or text messages used, the number of minutes or text messages remaining, a record of recent communication sessions, a record of recent funds added, and any termination notification information. The service account information can be transmitted from the service account information server 130 to the application 106 on the mobile device 102 and stored in the memory 108. This information may be transmitted periodically, transmitted during an interval of low usage (e.g., during the night), transmitted after each usage, transmitted after a predefined number of usages of the mobile device 102, transmitted when a predefined number of pre-paid minutes remains on the associated service account, and/or transmitted when a predefined number of pre-paid text messages remains on the associated service account.

In an embodiment, the application 106 on the mobile device 102 may allow the user to access service account information stored in the memory 108 and to add credit to a prepaid account for the communication service. The display screen 104 on the mobile device 102 may contain an icon or a scroll down menu to allow the user to easily view the service account information. For example, if a notification of impending account termination is received via a voice message or a message on the display screen 104, the user can access the application 106 to view service account information stored in the memory 108 and/or to add funds to the account. An input control on the mobile device 102 may allow funds to be added to the prepaid account possibly by entering credit/debit card information, prepaid top-up card information, or a routing number to a bank account. In addition, if the account is already terminated and the mobile device 102 can no longer be used for phone calls or text messages, the wireless application protocol (WAP) communication may remain activated to keep the mobile device 102 connected to the network 122, to allow the user to add funds to the account. Alternatively, funds can be added to the account via a website associated with the service provider.

Figure 2:
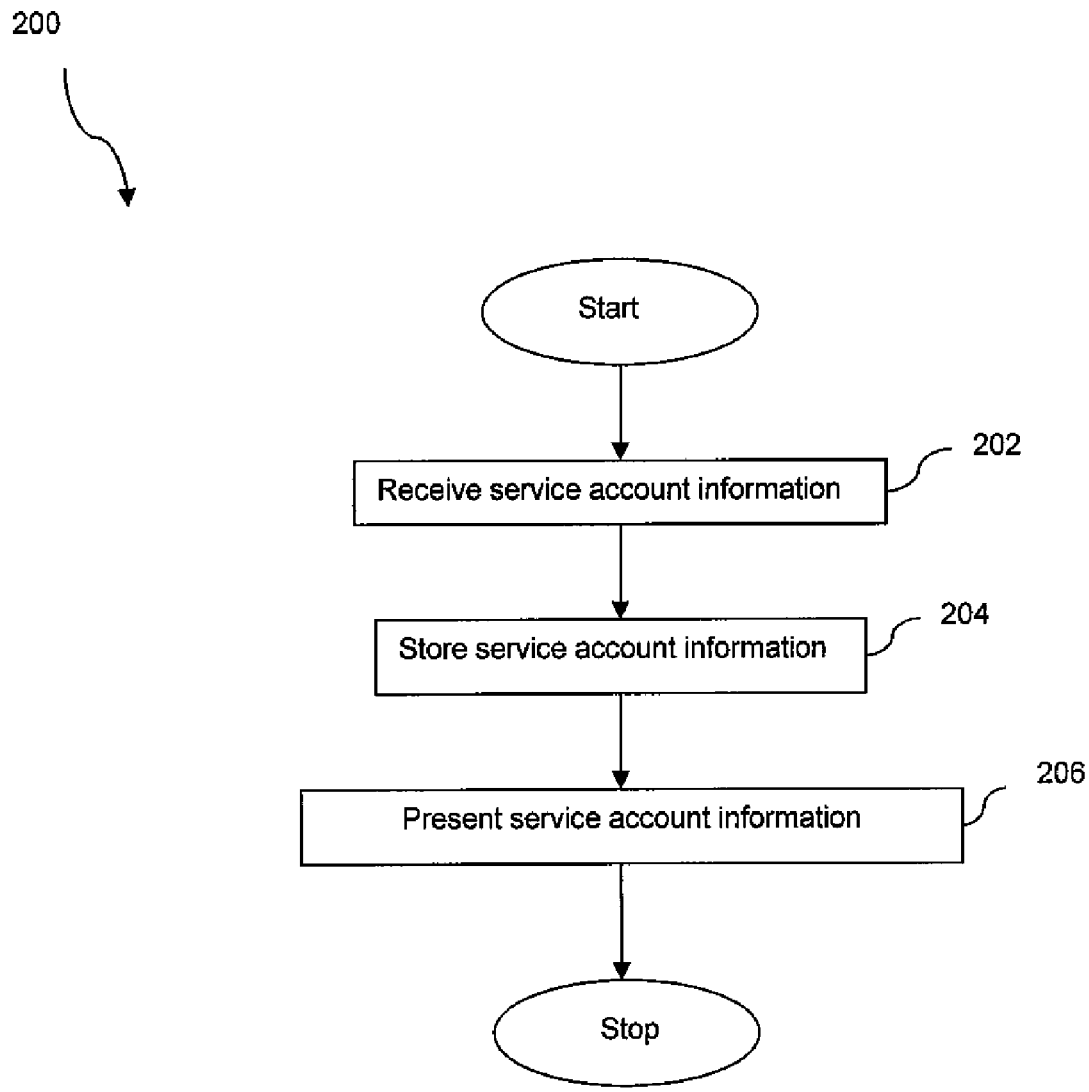
FIG. 2 is a flowchart of a method of providing customer service for a mobile communication device according to an embodiment of the disclosure.

Turning now to FIG. 2, a method 200 of providing customer service for the mobile device 102 is described. At block 202, the application 106 on the mobile device 102 receives wireless communication service account information from the service account database 132 at the service account information server 130. The service account information may include at least one of an identification of the service plan, a terms of the service plan (e.g., the number of minutes or text messages purchased), a date that the service plan was activated, an expiration date for the service plan, a current count of consumed minutes, a current count of consumed text messages, a current count of unused minutes, a current count of unused text messages, a record of a plurality of the most recent communication sessions, and any termination information. The service account information may be transmitted periodically, possibly during an interval of low usage (e.g., during the night). Alternatively the service account information may be transmitted after each usage or after a predefined number of usages of the mobile device 102. At block 204, the application 106 writes the updated service account information to the memory 108 to store on the mobile device 102.

In block 206, the service account information is presented on the display screen 104 on the mobile device 102. The display screen 104 may include an icon or a scroll down menu that allows the user to access the service account information (e.g., remaining minutes, termination information, payment information) stored in the memory 108. The display screen 104 may also include an input application that allows the user to add funds via a credit card or top-up card, or a link to a website to complete payment or to reinstate a terminated account. Alternatively in block 206, the service account information may be received by the mobile device 102 in the form of an audible message.

Figure 3:
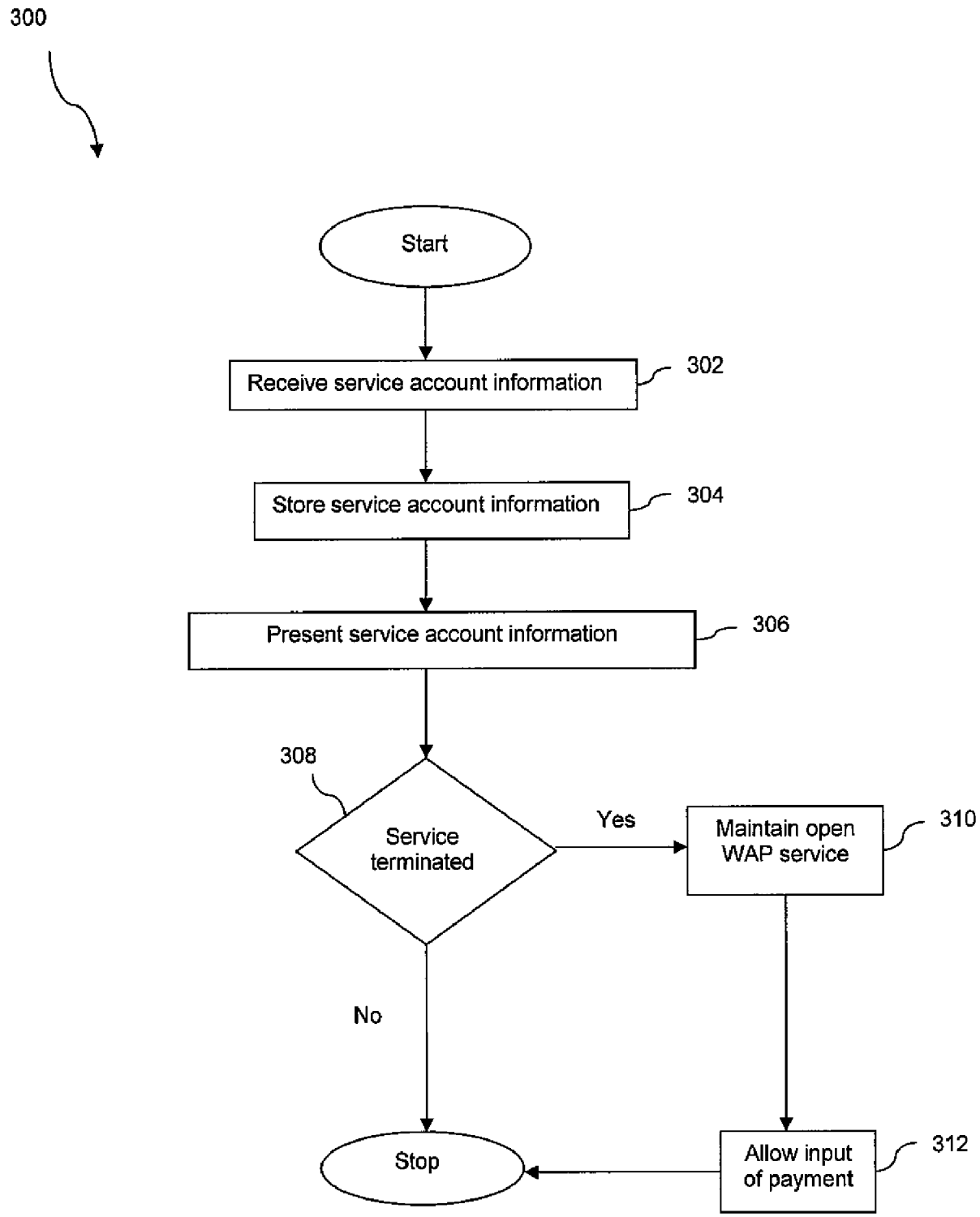
FIG. 3 is a flowchart of a method of completing payment for a wireless communication device according to an embodiment of the disclosure.

Turning now to FIG. 3, a method 300 for completing payment for a wireless communication service for the mobile device 102 is described. At block 302, the application 106 on the mobile device 102 receives wireless communication service account information from the service account database 132 at the service account information server 130. The wireless communication service account information may be received by one of code division multiplex access (CDMA), global system for mobile communications (GSM), and worldwide interoperability for microwave access (WiMAX) wireless communication technologies. The service account information may include at least one of a terms of a service plan (e.g., the number of minutes or text messages purchased), a date that the service plan was activated, a current count of consumed minutes, a current count of consumed text messages, a current count of unused minutes, a current count of unused text messages, a record of a plurality of the four to ten most recent communication sessions, and a notification that the wireless communication service is terminated. At block 304, the application 106 writes the updated service account information to the memory 108 to store on the mobile device 102. In block 306, the service account information is presented on the display screen 104 on the mobile device 102. The display screen 104 may include an icon or a scroll down menu that allows the user to access the account information.

In block 308, if the communication service has been terminated, the method 300 moves to block 310 where the wireless application protocol (WAP) communication with the network 122 remains open even though specific operational modes (e.g., voice messages, text messages) have been terminated. By keeping the wireless application protocol (WAP) communication open, the user can still access the application 106, view recent activity, and add funds to the account via a credit/debit card, even if the service plan has expired and no credit remains on the account. However, once the service is terminated, the user would not be able to make or receive any phone calls or to send or receive any text messages. Proceeding to block 312, the display screen 104 may include an input control that allows the user to add funds to the account via a credit card, debit card, or prepaid top up card. Once the funds are added, phone call and text message usage may be reinstated for the mobile device, along with a new terms of a wireless communication service plan.

Figure 4:
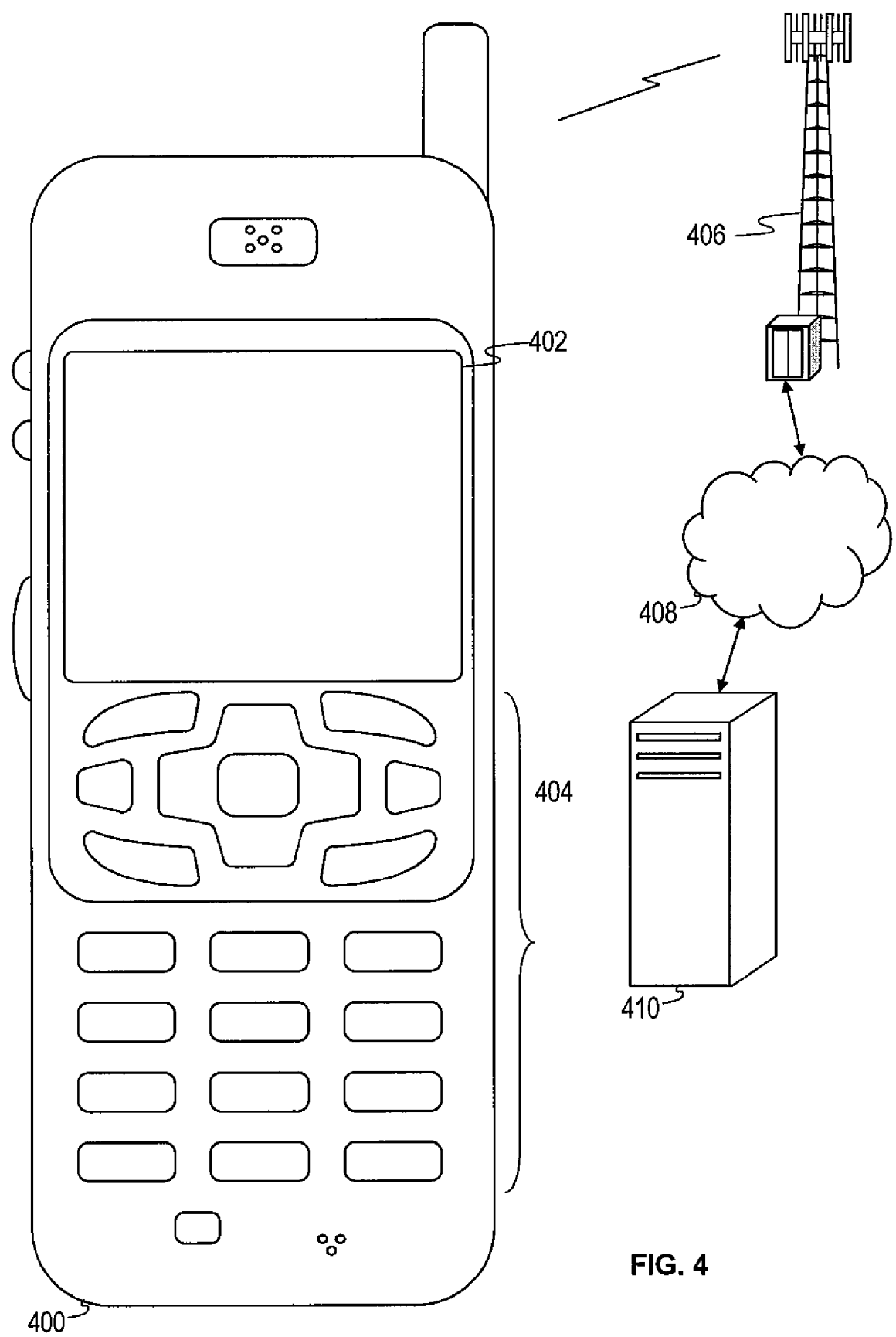
FIG. 4 illustrates a handset suitable for implementing an embodiment of the disclosure.

FIG. 4 shows a wireless communications system including the handset 400 which may be similar to the mobile device 102 in FIG. 1. FIG. 4 depicts the handset 400, which is operable for implementing aspects of the present disclosure, but the present disclosure should not be limited to these implementations. Though illustrated as a mobile phone, the handset 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special purpose communications device such as a mobile phone, wireless handset, pager, or PDA. The handset 400 may support specialized activities such as gaming, inventory control, job control, and/or task management functions, and so on.

The handset 400 includes a display 402 and a touch sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values to configure the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer mobile device.

The handset 400 may execute a web browser application which enables the display 402 to show a web page. The web page may be obtained via wireless communications with a base transceiver station (BTS) 406, a wireless network access node, a peer handset 400 or any other wireless communication network or system. While a single base transceiver station 406 is illustrated, it is understood that the wireless communication system may comprise additional base transceiver stations. In some instances, the handset 400 may be in communication with multiple base transceiver stations 406 at the same time. The base transceiver station 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the base transceiver station 406 through a peer handset 400 acting as an intermediary, in a relay type or hop type of connection.

Figure 5:
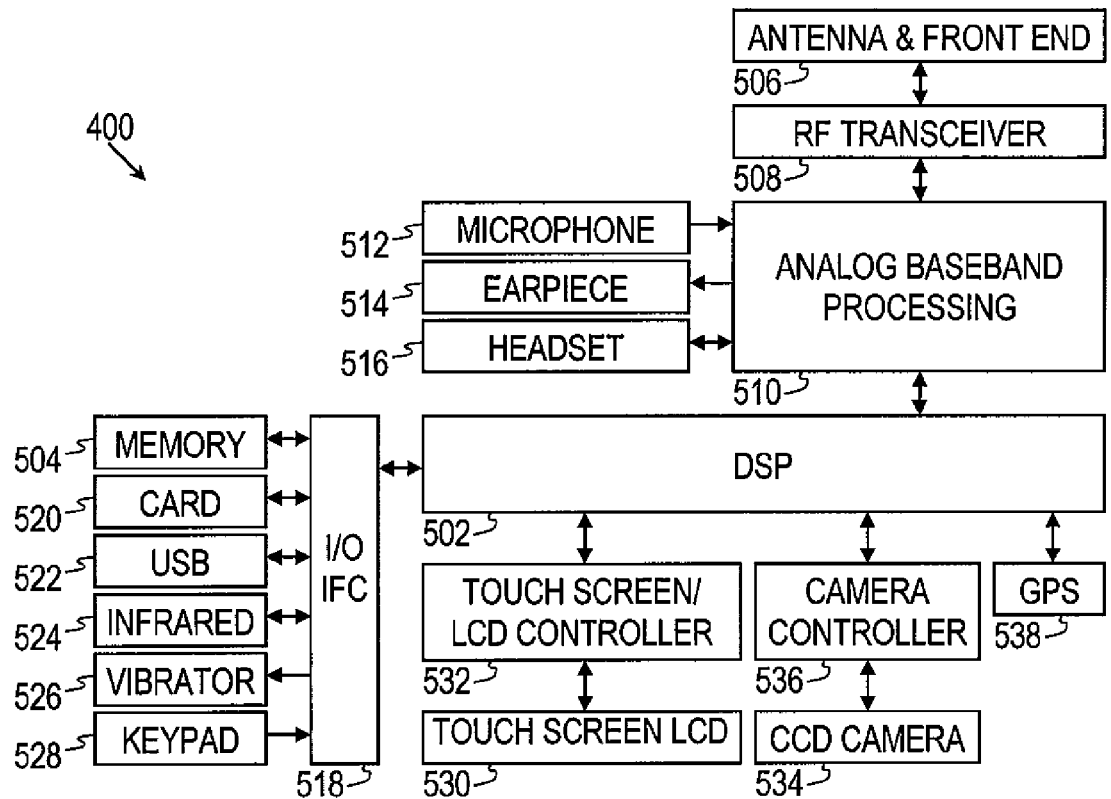
FIG. 5 is a block diagram of a handset suitable for implementing an embodiment of the disclosure.

FIG. 5 shows a block diagram of the handset 400. While a variety of known components of handsets 400 are depicted, in an embodiment, a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine readable instructions that configure the DSP 502 to provide the desired functionality, or the application software may be high level software instructions to be processed by an interpreter or compiler to indirectly configure the DSP 502.

The antenna and front end unit 506 may be provided to convert between wireless signals and electrical signals, enabling the handset 400 to send and receive information from a radio access network (RAN) or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the handset 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide Internet connectivity to enable a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526, so that when triggered, causes the handset 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge coupled device cameras may be employed. Various other peripherals may also be included to provide additional functions such as radio and television reception.

Figure 6:
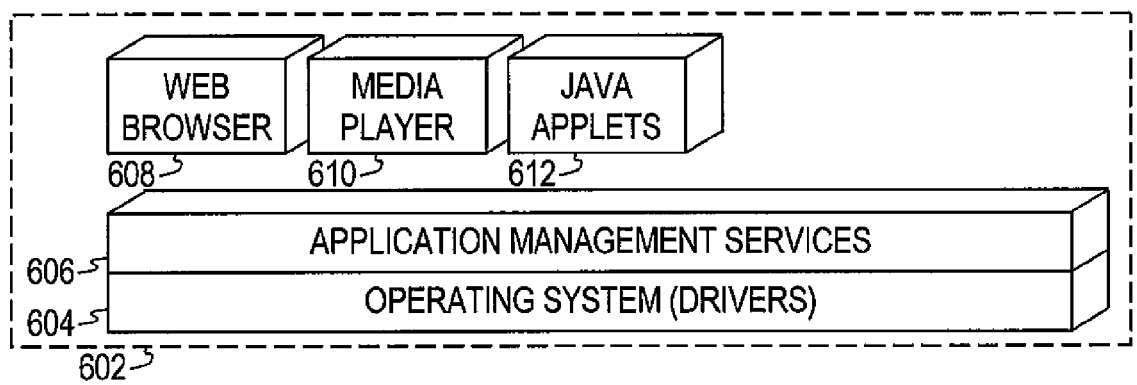
FIG. 6 is a block diagram of a software architecture of a handset suitable for implementing an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the handset 400. Also shown in FIG. 6 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality.

Figure 7:
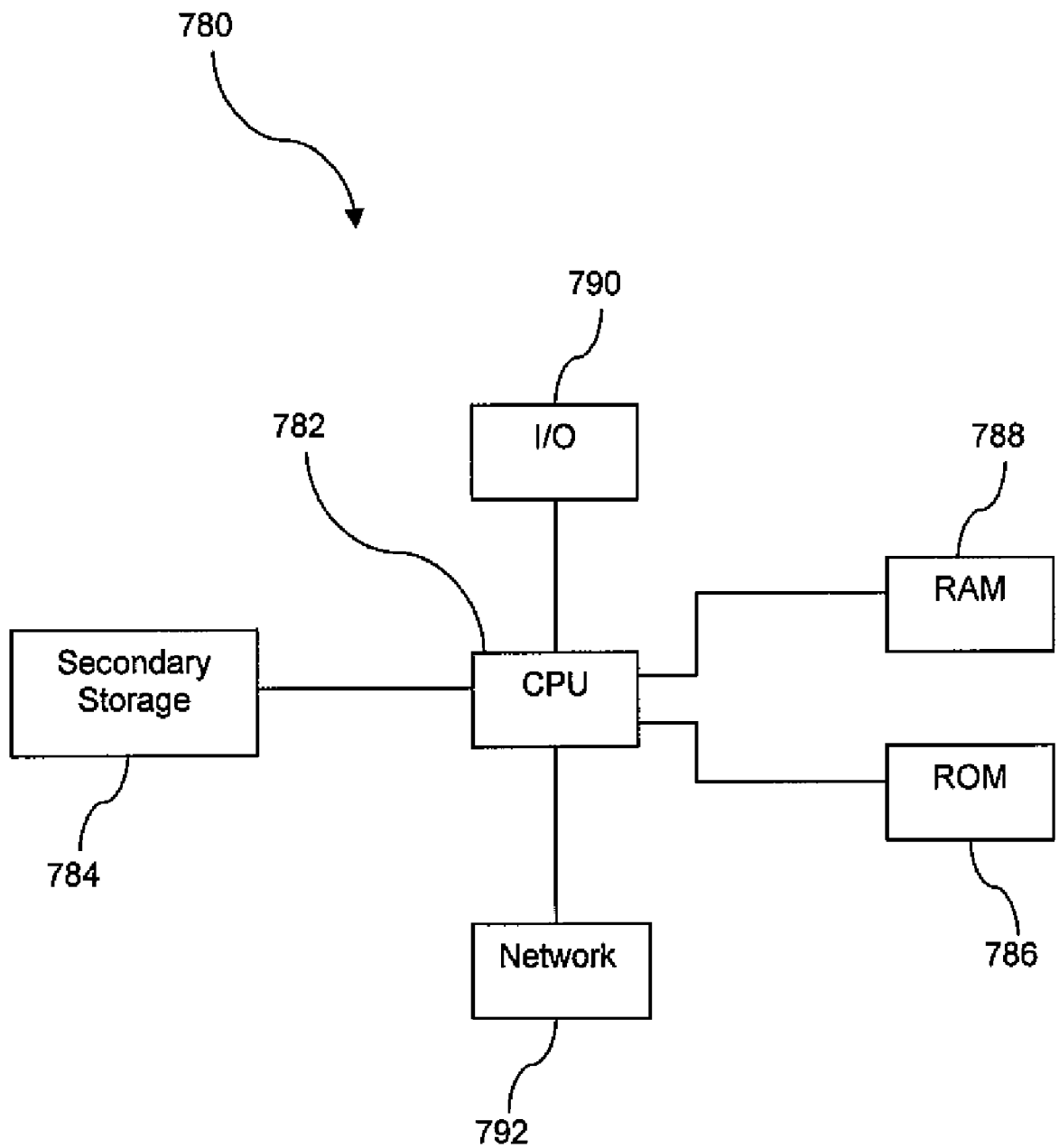
FIG. 7 illustrates an exemplary general purpose computer system suitable for implementing some aspects of the several embodiments of the disclosure.

Some aspects of the system described above may be implemented on any general purpose computer with sufficient processing power, memory resources, and network throughput capability to handle the necessary workload placed upon it. FIG. 7 illustrates a typical, general purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store non-volatile data or overflow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing customer service for a mobile communication device, comprising:
    receiving a wireless communication service account information associated with a prepaid account, wherein the wireless communication service account information comprises at least one of an identification of a service plan, a terms of the service plan, a date of the service plan, a current count of consumed service minutes, a current count of consumed text messages, a current count of unused service minutes, a current count of unused text messages, and a record of a plurality of most recent communication sessions, and wherein the wireless communication service account information further comprises a notification that the prepaid account is terminated;
    storing the wireless communication service account information in a memory of the mobile communication device;
    maintaining at least one communication service to enable replenishment of funds to the prepaid account when no credit remains on the prepaid account, wherein the maintained at least one communication service is a wireless application protocol (WAP) service;
    terminating at least one communication service when no credit remains on the prepaid account;
    subsequent to the terminating and in response to receiving a control input selection, presenting at least some of the wireless communication service account information on a display of the mobile communication device; and
    disabling the wireless application protocol service a predefined length of time after receiving the notification that the prepaid account is terminated.

2. The method of claim 1, wherein receiving and storing the wireless communication service account information is performed periodically.

3. The method of claim 2, wherein receiving and storing the wireless communication service account information is performed daily during an interval of low usage of a wireless communication network serving the mobile communication device.

4. The method of claim 1, wherein receiving and storing the wireless communication service account information is performed each time the mobile communication device engages in a communication session.

5. The method of claim 1, wherein the wireless communication service account information further comprises a reason for the termination of the prepaid account.

6. The method of claim 5, wherein the wireless communication service account information further comprises a link to a web site to complete a payment to reinstate the terminated prepaid account.

7. The method of claim 1, further including in response to receiving the control input selection, presenting at least some of the wireless communication service account information as an audible message.

8. The method of claim 1, further comprising:
  in response to receiving the notification that the prepaid account is terminated, maintaining the wireless application protocol service for the mobile communication device while disabling a wireless voice communication service and a wireless text communication service for the mobile communication device, wherein the wireless application protocol service enables funds to be added to the prepaid account;
  presenting an input control for initiating a payment to add credit to the prepaid account; and
  in response to receiving a payment input, transmitting a payment transaction message over the wireless application protocol service to add credit to the prepaid account.

9. The method of claim 1, wherein the record contains from four to ten of the most recent communication sessions.

10. The method of claim 1, wherein the wireless communication service account information is received via one of code division multiplex access (CDMA), global system for mobile communications (GSM), and worldwide interoperability for microwave access (WiMAX) wireless communication technologies.

11. The method of claim 1, further comprising writing the wireless communication service account information to a memory on the mobile communication device.

12. The method of claim 11, wherein the memory is a non-volatile memory that retains the wireless communication service account information when the mobile device is powered off.

13. The method of claim 1, wherein the display is a multi-line graphical display.

14. The method of claim 1, wherein the display is a single line, text only display.

15. The method of claim 1, wherein at least some of the wireless communication service account information is presented as an audible message played through one of a speaker or an earpiece associated with the mobile communication device.

16. The method of claim 1, wherein the wireless communication service account information further comprises information about funds added to an account balance.

17. The method of claim 1, further comprising providing an interface for adding funds to a pre-paid account associated with the wireless communication service account and communicating information about the added funds to a provider of the wireless communication service.

18. The method of claim 1, wherein the terminated at least one communication service is at least one of a wireless voice communication service and a wireless text communication service for the mobile communication device.

19. The method of claim 1, wherein the wireless application protocol service enables funds to be added to the prepaid account.

* * * * *